United States Patent
Shawcross et al.

(10) Patent No.: US 6,461,416 B1
(45) Date of Patent: Oct. 8, 2002

(54) 1,3,4,-THIADIAZOLYLAZO DYES AND INK COMPOSITIONS CONTAINING THE SAME

(75) Inventors: Andrew Paul Shawcross; Barry Huston Meyrick; Mark Holbrook; Roy Bradbury, all of Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/647,463

(22) PCT Filed: Mar. 15, 1999

(86) PCT No.: PCT/GB99/00772

§ 371 (c)(1),
(2), (4) Date: Sep. 29, 2000

(87) PCT Pub. No.: WO99/50357

PCT Pub. Date: Oct. 7, 1999

(30) Foreign Application Priority Data

Mar. 31, 1998 (GB) ............................................... 9806809
Mar. 31, 1998 (GB) ............................................... 9806812

(51) Int. Cl.$^7$ ........................ C09D 11/00; C09D 11/02; C09B 29/039; B05D 1/26; B32B 3/00; B32B 27/14

(52) U.S. Cl. ...................... 106/31.5; 534/795; 427/466; 428/195

(58) Field of Search ........................ 106/31.5; 534/795; 427/466; 428/195

(56) References Cited

U.S. PATENT DOCUMENTS

| | | | |
|---|---|---|---|
| 3,657,215 A | 4/1972 | Weaver et al. | 534/777 |
| 3,673,169 A | 6/1972 | Weaver et al. | 534/794 |
| 4,036,826 A | * 7/1977 | Boehmke | 534/604 |
| 4,101,541 A | * 7/1978 | Petitpierre et al. | 534/581 |
| 4,271,071 A | * 6/1981 | Clark | 534/735 |
| 4,318,851 A | * 3/1982 | Austin et al. | 534/795 |
| 4,528,368 A | 7/1985 | Weaver et al. | 534/768 |
| 5,518,983 A | * 5/1996 | Bradbury et al. | 428/195 |
| 5,635,442 A | * 6/1997 | Bradbury et al. | 428/195 |
| 6,200,371 B1 | * 3/2001 | Meyrick et al. | 106/31.5 |
| 6,235,096 B1 | * 5/2001 | Meyrick et al. | 106/31.32 |

FOREIGN PATENT DOCUMENTS

| | | |
|---|---|---|
| EP | 023 386 | 2/1981 |
| GB | 2 079 303 | 2/1981 |
| GB | 2 104 909 | 3/1983 |
| JP | 55-026264 | 2/1980 |
| JP | 55 104353 | 8/1980 |
| JP | 55-118965 | 9/1980 |
| JP | 56-024452 | 3/1981 |
| JP | 57-000169 | 1/1982 |
| JP | 57-090055 | 6/1982 |
| JP | 57-095381 | 6/1982 |
| WO | WO 94 09073 | 4/1994 |
| WO | WO 98/14525 | 4/1998 |

* cited by examiner

Primary Examiner—Helene Klemanski
(74) Attorney, Agent, or Firm—Pillsbury Winthrop LLP

(57) ABSTRACT

A dye of Formula (1):

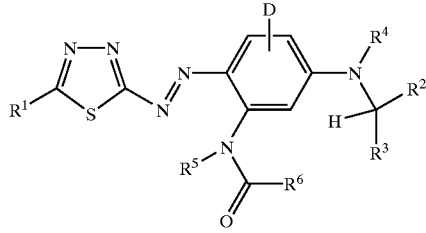

Formula (1)

$R^1$ and D are each independently H or a substituent;

$R^2$ and $R^3$ are each independently optionally substituted alkyl, aryl or aralkyl, or $R^2$ and $R^3$ together with the carbon atom to which they are attached form an optionally substituted ring;

$R^4$ is H or optionally substituted alkyl, aryl or aralkyl; and $R^5$ and $R^6$ are each independently optionally substituted alkyl, aryl or aralkyl.

Also claimed are compositions containing the dye, water and a water-dissipatable polymer.

16 Claims, No Drawings

1,3,4,-THIADIAZOLYLAZO DYES AND INK COMPOSITIONS CONTAINING THE SAME

This application is the national phase of international application PCT/GB99/00772 filed Mar. 15, 1999 which designated the U.S.

This invention relates to compositions, dyes, cartridges, ink jet printers and to their use in ink jet printing.

Ink jet printing methods involve a non-impact printing technique for printing an image onto a substrate using ink droplets ejected through a fine nozzle onto a substrate without bringing the nozzle into contact with the substrate.

There are many demanding performance requirements for dyes and inks used in ink jet printer. For example they should desirably exhibit some or all of the following properties. They should provide sharp, non-feathered images having good water-fastness, light fastness and/or optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. The most popular ink jet printers are the thermal and piezoelectric ink jet printers.

We have now found that very good ink jet printing inks may be prepared having the compositions defined below using a specific class of dyes that give stable dye resin inks with some or all of these advantageous properties.

According to the present invention there is provided a composition comprising water, a water-dissipatable polymer and one or more dyes of Formula (1):

Formula (1)

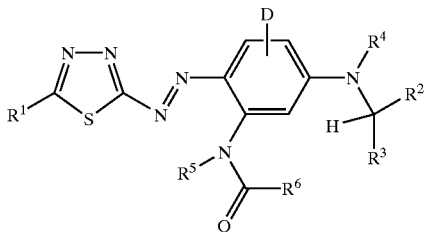

wherein:

$R^1$ and D are each independently H or a substituent;

$R^2$ and $R^3$ are each independently optionally substituted alkyl, aryl or aralkyl, or $R^2$ and $R^3$ together with the carbon atom to which they are attached form an optionally substituted ring;

$R^4$ and $R^5$ are each independently H or optionally substituted alkyl, aryl or aralkyl; and $R^6$ is optionally substituted alkyl, aryl or aralkyl.

When $R^1$ or D is a substituent it is preferably halo; optionally substituted alkyl, aryl or aralkyl; or a group of formula —X—$R^7$ wherein X is O, S, SO, $SO_2$ or $NR^8$ wherein $R^7$ and $R^8$ are each independently H or optionally substituted alkyl, aryl or aralkyl.

When $R^1$, $R^2$, $R^3$, $R^4$, $R^5$, $R^6$, $R^7$ or $R^8$ is optionally substituted alkyl it is preferably optionally substituted $C_{1-6}$-alkyl.

When $R^1$, $R^2$, $R^3$, $R^4$, $R^5$, $R^6$, $R^7$ or $R^8$ is optionally substituted aryl it is preferably optionally substituted $C_{6-12}$-aryl, more preferably optionally substituted phenyl or naphthyl.

When $R^1$, $R^2$, $R^3$, $R^4$, $R^5$, $R^6$, $R^7$ or $R^8$ is optionally substituted aralkyl it is preferably optionally substituted benzyl or xylyl.

$R^1$ and D are preferably each independently H, optionally substituted $C_{1-6}$-alkyl, or a group of formula —X—$R^7$ wherein X is O, S, SO, $SO_2$ or $NR^8$ wherein $R^7$ and $R^8$ are each independently H or optionally substituted $C_{1-6}$-alkyl.

X is preferably O, S or $NR^8$ wherein $R^8$ is H or $C_{1-6}$-alkyl.

$R^2$ and $R^3$ are preferably each independently optionally substituted $C_{1-6}$-alkyl, or $R^2$ and $R^3$ together with the carbon atom to which they are attached form an optionally substituted 5- or 6-membered ring, especially an optionally substituted cyclopentane or cyclohexane ring.

$R^4$ and $R^5$ are preferably each independently H or optionally substituted $C_{1-6}$-alkyl, more preferably H or $C_{1-6}$-alkyl.

$R^6$ is preferably optionally substituted $C_{1-6}$-alkyl, more preferably $C_{1-6}$-alkyl.

$R^7$ is preferably optionally substituted $C_{1-6}$-alkyl, more preferably optionally substituted $C_{1-4}$-alkyl.

$R^8$ is preferably H or $C_{1-6}$-alkyl.

The optional substituents which may be present on $R^1$ to $R^8$ or on D are preferably each independently selected from carboxy, sulpho, nitro, halo (especially bromo, chloro and fluoro), alkyl (especially $C_{1-4}$-alkyl), alkoxy (especially $C_{1-4}$-alkoxy), hydroxy, amine (especially —$NHR^9$), mercapto, thioalkyl (especially $C_{1-4}$-thioalkyl), cyano, ester (especially —$OCOR^9$ or —$COOR^9$) and amide (especially —$CONHR^9$), wherein $R^9$ is H or optionally substituted $C_{1-4}$-alkyl (preferably H or $C_{1-4}$-alkyl).

In one embodiment of the present invention $R^2$ and $R^3$ are free from the following substituents: —$NO_2$, —CN, —Cl, —Br, —F, —OH, —$OC_{1-4}$-alkyl, —$CONH(C_{1-4}$-alkyl), —$CONH_2$, —$COOC_{1-4}$—$(CH_2)_{1-4}$—CN, —$OCO(C_{1-4}$-alkyl) and —$COO(C_{1-4}$-alkyl).

In a second embodiment of the present invention at least one of $R^2$ and $R^3$ carries a substituent selected from —$NO_2$, —CN, —Cl, —Br, —F, —OH, —$OC_{1-4}$-alkyl, —$COOC_{1-4}$—$(CH_2)_{1-4}$—CN, —$CONH_2$, —$CONH(C_{1-4}$-alkyl), —$OCO(C_{1-4}$-alkyl) and —$COO(C_{1-4}$-alkyl).

The preferred optional substituents for $R^8$ are said optional substituents are each independently selected from carboxy, sulpho, nitro, halo, alkyl, alkoxy, hydroxy, amine, mercapto, thioalkyl, cyano, ester and amide, more preferably from —$NO_2$, —CN, —Cl, —Br, —F, —OH, —$OC_{1-4}$-alkyl, —$OC_{1-4}$-alkylene—CN, —$CONH_2$, —$COOC_{1-4}$—$(CH_2)_{1-4}$—CN, —$OCO(C_{1-4}$-alkyl) and —$COO(C_{1-4}$-alkyl), especially from —CN and —$COO(C_{1-4}$-alkyl), especially —CN. Preferably $R^8$ carries one or two substituents, more preferably one substituent.

Any alkyl groups in dyes of Formula (1) may be branched or straight chain. Preferred branched chain alkyl groups are α-branched alkyl groups.

The dyes may be in any form, for example in the form of a salt. Formula (1) includes all tautomers, stereoisomers, zwitterions, polymorphs, and isotopes of dyes falling within the formula.

Salts of Formula (1) may be formed from one or more organic and/or inorganic bases or acids. Preferred salts of Formula (1) are insoluble in water.

The compositions preferably contain from 1 to 10, more preferably from 1 to 6, especially from 1 to 3, more especially 1 dye of Formula (1).

The dye of Formula (1) is preferably insoluble in water and soluble in the water-dissipatable polymer. Therefore the dye is preferably free from carboxy and sulpho groups, for example it is preferably a disperse or solvent-soluble dye. Disperse and solvent soluble dyes are distinct from pigments in that pigments are insoluble in organic solvents and polyesters whereas disperse and solvent soluble dyes are soluble in organic solvents and polymers.

According to a second feature of the present invention there is provided a dye of Formula (1) as hereinbefore defined. The preferences for the dye of Formula (1) are as hereinbefore described in relation to the preferred dyes used in the inks of the invention.

The dyes of Formula (1) may be prepared by diazotising a suitable amine, using a diazotising agent, preferably below 5° C., and coupling to a suitable coupling component. A preferred diazotising agent is sodium nitrite. A suitable amine is of Formula (2) and a suitable coupling component is of Formula (3):

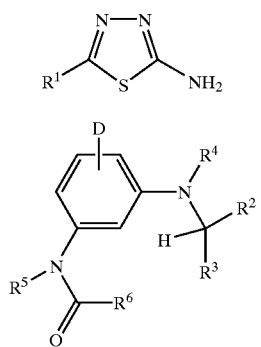

(2)

(3)

wherein $R^1$, $R^2$, $R^3$, $R^4$, $R^5$, $R^6$ and D are as hereinbefore defined.

Generally from 3 to 5 molar equivalents of the amine are used relative to the amount of the coupling component. If desired the resultant dye may be further reacted, for example by condensation with an acyl halide or an anhydride to convert some or all of any hydroxy groups to ester groups.

The composition may contain further dyes other than those of Formula (1), although this is not normally necessary.

The water-dissipatable polymer preferably bears ionised carboxy and/or sulphonate groups, especially ionised sulphonate groups, because these assist water dissipatability of the polymer. Such groups can be chain pendant and/or terminal.

The water-dissipatable polymer is preferably a water-dissipatable polyester. The water-dissipatable polyester can be prepared using conventional polymerisation procedures known to be effective for polyester synthesis. Thus, it is well known that polyesters contain carbonyloxy (i.e. —C(=O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using the method, and using the materials, described in International Patent Publication number WO 98/14525 of Zeneca Limited, page 11, line 15, to page 13, line 7, which is incorporated directly herein by reference thereto.

Polyesters bearing ionised carboxy groups can be prepared by various means, for example by the method, and using the materials, described in International Patent Publication number WO 98/14525 of Zeneca Limited, page 13, line 9 to page 13, line 30, which is incorporated directly herein by reference thereto.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethlene glycols and alkyl ethers of polyethylene glycols, examples of which include:

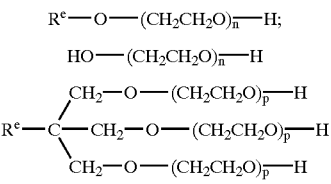

wherein $R^8$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably as described in International Patent Publication number WO 98/14255 of Zeneca Limited, page 14, line 31 to page 15, line 3, which is incorporated directly herein by reference thereto.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1,000 to 25,000. These Mn lead to particularly good storage stability for the resultant inks. The measurement of Mn is well known to those skilled in the art, and may for example be effected using gel permeation chromatography in conjunction with a standard polymer such as polystyrene or polymethylmethacrylate of known molecular weight.

The water-dissipatable polyester preferably has a hydroxyl number of from 0 to 225 mg KOH/g, more preferably 0 to 125 mg KOH/g, especially from 0 to 50 mgKOH/g.

The ink preferably has a pH of 5 to 9, more preferably 5.5 to 8, especially 6 to 7.5. These preferences are based on increased ink stability.

The Tg of the water-dissipatable polyester (i.e. the temperature at which the polymer changes from a glassy, brittle state to a plastic, rubbery state) is preferably in the range −38° C. to 105° C., more preferably −20 to 70° C., especially −10° C. to 60° C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or comminuted solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

The water-dissipatable polymer may also be formed by the method, and using the materials, described in International Patent Publication number WO 98/14525 of Zeneca Limited, page 16, line 8 to page 16, line 34, which is incorporated directly herein by reference thereto.

The dyed water-dissipatable polymer may be prepared by heating a water-dissipatable polymer and dye(s) at an elevated temperature, for example at a temperature in the range 35 to 150° C., preferably from 40 to 90° C. Simply mixing the dye and polymer in water at room temperature leads to a slight up-take of colour but heating is usually necessary for a full dyeing.

Preferably compositions according to the invention are prepared by mixing together (i) a solution of a dye(s) in a water-immiscible solvent and (ii) a mixture of a water-dissipatable polymer, water-miscible solvent and optionally water. Equally the compositions may be prepared by mixing together (i) a solution of a dye(s) in a mixture of a water-miscible solvent and a water-immiscible solvent and (ii) a water-dissipatable polymer and optionally water. In either case, if there is no water in component (ii) the water may be added to the mixture of (i) a (ii) subsequently to give acomposition according to the invention. However it is preferred for component (ii) to contain water. These processes lead to particularly good up-take of dye(s) by the polymer to give intensely coloured composition.

The amount of dye and water-dissipatable polymer contained in the composition will vary according to the depth of shade required. Typically, however, the composition will comprise (a) from 0.5 to 15 parts, more preferably 0.8 to 10 parts, especially 1 to 5 parts in total of the dye(s);

(b) from 0.2 to 25 parts, more preferably 2 to 15 parts of a water-dissipatable polymer;

(c) from 40 to 90 parts, more preferably from 50 to 80 parts of water; and (d) from 0 to 60 parts, more preferably 0 to 40 parts of organic solvent;

wherein all parts are by weight and the total number of parts of (a)+(b)+(c)+(d) add up to 100.

The number of parts of the water-dissipatable polymer is calculated on a 100% solids basis. For example 50 g of a 20% solids polymer is taken as 10 g of polymer.

The composition may also contain an organic solvent (as mentioned in (d) above) and this may be a mixture of organic solvents. In a preferred embodiment the composition contains an organic solvent comprising a water-miscible organic solvent and a water-immiscible organic solvent.

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2-C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy] ethanol, 2-[2-(2-ethoxyethoxy)ethoxy]-ethanol; cyclic esters and cyclic amides, e.g. optionally substituted pyrollidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Component (d) of the above mentioned composition preferably comprises;
  (i) 5 to 50% of a water-immiscible alcohol having at least six carbon atoms, (especially benzyl alcohol); and
  (ii) 50 to 95% of a water-miscible solvent comprising;
    (a) a cyclic ester or cyclic amide (especially an optionally substituted pyrrolidone);
    (b) a water-miscible $C_{1-6}$-alkyl mono ether of a $C_{2-6}$-alkylene glycol or $C_{1-6}$-alkyl mono ether of poly($C_{2-6}$-alkylene glycol); or
    (c) a mixture of (a) and (b).
wherein all % are by weight and add up to 100%.

The water-immiscible solvent preferably has a solubility in water at 20° C. of up to 50 g/l. The water-miscible solvent preferably has a solubility in water at 20° C. of more than 50 g/l.

The preferred optionally substituted pyrrolidones, are 2-pyrrolidone, dimethyl pyrrolidone, N-methyl-2-pyrrolidone, N-ethyl-2-pyrrolidone and N-(2-hydroxyethyl)-2-pyrrolidone and mixtures thereof.

The ratio of water-miscible organic solvent to water-immiscible organic solvent is preferably 19:1 to 1:1, more preferably 8:1 to 1:1, especially 5:1 to 1:1.

Use of dyes has advantages over the use of pigments in that less dye is usually required than would be the case for a pigment, expensive milling is avoided, the composition are less likely to form a precipitate on standing, a far greater variety of shades are available and the resultant prints have good transparency. The composition of the present invention also benefit from good light- and water-fastness.

A valuable feature of the invention is the low tendency for blocking the nozzles of thermal ink jet printers. Many other water dispersible polymer composition work poorly or even not at all in thermal printers. Composition of the invention form discrete droplets on the substrate with little tendency for diffusing. Consequently sharp images can be obtained, resulting in excellent print quality and little if any bleed between colours printed side-by side.

Preferably the composition is an ink, more preferably an ink jet printing ink. When the composition is not an ink it may be used as concentrated colorant for the preparation of an ink.

Preferably the composition has been filtered through a filter having a mean pore size below 10 μm, more preferably below 5 μm especially below 2 μm, more especially below 1 μm. In this way reliability of the ink jet printer is improved by removing particulate matter which could otherwise block the fine nozzles of the printer.

A third feature of the invention provides a composition comprising a water dissipatable polymer and a dye as hereinbefore defined, preferably of Formula (1). In these compositions the preferred water-dissipatable polymers and dyes are as hereinbefore described. Such compositions may be dissipated in water and optionally mixed with further ingredients to give an ink, for example with one or more organic solvents.

The composition of the third feature of the present invention preferably comprises (a) 0.125 to 40 parts of a dye as hereinbefore defined (preferably of Formula (1) or (2)); and (b) 99.875 to 60 parts of a water-dissipatable polymer, wherein the total number of parts of (a) and (b) adds up to 100.

According to a further feature the present invention provides a process for printing an image on a substrate comprising applying thereto a composition comprising water, a water-dissipatable polymer and a dye as hereinbefore defined (preferably of Formula (1) or (2)) by means of an ink jet printer.

The ink jet printer emits droplets of the composition onto a substrate from a nozzle without bringing the nozzle into contact with the substrate. Preferably the ink jet printer is a thermal or piezoelectric ink jet printer.

The substrate is preferably a paper, an overhead projector slide or a textile material. Preferred textile materials are cotton, polyester and blends thereof.

When the substrate is a textile material the process for printing an image thereon according to the invention preferably further comprises the step of heating the resultant printed textile, preferably to a temperature of 50° C. to 250° C.

A further feature of the present invention is a cartridge suitable for use in an ink jet printer containing acomposition according to the invention. Also there is provided an ink jet printer containing acomposition according to the invention.

The invention is further illustrated by the following examples in which all parts and percentages are by weight unless specified otherwise.

Water-Dissipatable Polymer ("Resin 1")

To a glass reactor fitted with distillation column and condenser were charged ingredients A, B, D, F, G and 50% of C and 50% of H. The contents were heated with stirring to a reaction temperature of 210° C. until the mixture was clear and the acid value was <10 mg(KOH)g$^{-1}$. At this point E and the remainder of C and H were charged and the temperature raised to 230° C. The reaction was continued under reduced pressure until an acid value of 5.3 mg(KOH)g$^{-1}$ was obtained. The resin was further characterised by a hydroxyl value=27.6 mg(KOH)g$^{-1}$, ICI Cone and Plate viscosity @125° C.=80 poises and a Tg (onset)=25.4° C. and a number average molecular weight by end group analysis of approximately 2000. The resin was readily dispersed in warm distilled water to give a clear solution having a solids content of 20% w/w (hereinafter "Resin 1").

| Resin 1 | | |
| --- | --- | --- |
| Monomer | Abbreviation | Weight (g) |
| Neopentyl glycol | A | 206.25 |
| Diethylene glycol | B | 82.5 |
| Isophthalic acid | C | 300 |
| Sodio-5-sulpho-isophthalic acid | D | 75 |
| Adipic acid | E | 37.5 |
| Methoxy PEG 750 | F | 75 |
| Sodium acetate | G | 1.5 |
| Fascat 4101 | H | 0.75 |

Water-Dissipatable Polymer ("Resin 2")

To a glass reactor fitted with distillation column and condenser were charged ingredients A, B, C, E, G, H and 50% of D and 50% of I. The contents were heated with stirring to a reaction temperature of 210° C. until the mixture was clear and the acid value was 1.25 mg(KOH)g$^{-1}$. At this point F and the remainder of D and I were charged and the temperature raised to 230° C. The reaction was continued under reduced pressure until an acid value of 2.8 mg(KOH)g$^{-1}$ was obtained. The resin was further characterised by a hydroxyl value=19.7 mg(KOH)g$^{-1}$, ICI Cone and Plate viscosity @125° C.=90 poises and a Tg (onset)=4° C. The resin was readily dispersed in warm distilled water to give a clear solution having a solids content of 20% w/w. (hereinafter "Resin 2").

| Resin 2 | | |
|---|---|---|
| Monomer | Abbreviation | Weight (g) |
| Neopentyl glycol | A | 653.47 |
| Diethylene glycol | B | 479.21 |
| Hexane-1,6-diol | C | 396.04 |
| Isophthalic acid | D | 1584.16 |
| Sodio-5-sulpho-isophthalic acid | E | 396.04 |
| Adipic acid | F | 198.02 |
| Methoxy PEG 750 | G | 396.04 |
| Sodium acetate | H | 8 |
| Fascat 4101 | I | 4 |

Water-Dissipatable Polymer ("Resin 3")

To a glass reactor fitted with distillation column and condenser were charged ingredients A, B, D, E, F, G and 50% of C and 50% of H. The contents were heated with stirring to a reaction temperature of 210° C. until the mixture was clear and the acid value was <10 mgKOH/g. At this point the remainder of C and H were charged and the temperature raised to 230° C. The reaction was continued under reduced pressure until an acid value of 9.4 mg(KOH) $g^{-1}$ was obtained. The resin was further characterised by a hydroxyl value=12.8 mg(KOH)$g^{-1}$, ICI Cone and Plate Viscosity @125° C.=>500 poises and a Tg (onset)=18° C. The number average molecular weight as determined by gel permeation chromatography (PS Equivalents) was 1800. The resin was readily dispersed in warm distilled water to give a clear solution having a solids content of 20% w/w (hereinafter "Resin 3").

| Resin 3 | | |
|---|---|---|
| Monomer | Abbreviation | Weight (g) |
| Neopentyl glycol | A | 15 |
| Diethylene glycol | B | 10 |
| Isophthalic acid | C | 45 |
| Sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

EXAMPLE 1

Preparation of a Dye of the Following Formula
Dye 1

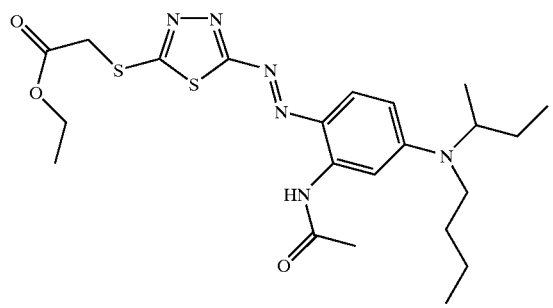

(a) Preparation of 3-(N-n-Butyl-N-sec-butylamino) Acetanilide (i) 3-(N-sec-Butylamino)acetanilide 3-Aminoacetanilide (186.2 g), 2-bromobutane (198 g), triethylamine (150 g) and ethanol (1 liter) were heated under reflux for 64 hours. After cooling to room temperature, the reaction mixture was filtered to remove triethylamine hydrochloride and the solvent was evaporated under reduced pressure to leave a dark oil which was purified by chromatography on silica gel. The product was crystallised by trituration under hexane to give 152 g of product.

(ii) 3-(N-n-Butyl-N-sec-butylamino)Acetanilide 3-(N-sec-butylamino)acetanilide from stage (a) (i) (20.6 g), 1-bromobutane (63.7 g) and anhydrous potassium carbonate (13.8 g) were stirred and heated under reflux for 36 hours. The cooled reaction mixture was diluted with methanol (50 ml) and filtered to remove the inorganic salts. Evaporation of the excess bromobutane and methanol under reduced pressure gave a viscous oil which was purified by chromatography on silica gel to give 18.3 g of product.

(b) Preparation of Title Dye

Acetic acid (100 ml), propionic acid (16.0 ml) and nitrosyl sulphuric acid (22.9 ml) were stirred together whilst lowering the temperature to 0–5° C. Amine of formula

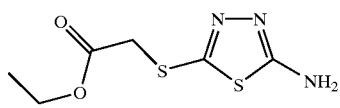

(11.1 g available commercially from Maybridge Chemical Company, used without further purification) was added portionwise to the mixture, with the temperature kept at 0–5° C. Once addition was completed the reaction mixture was stirred at 0–5° C. for 2 hours and the excess nitrous acid destroyed with sulphamic acid. The resulting diazonium salt solution was slowly added to a solution of 3-(N-n-butyl-N-sec-butylamino)acetanilide (13.1 g from stage (a)(ii) above) in methanol (400 ml) at 0–5° C. When addition was complete the pH was raised to 4.5 by the addition of sodium acetate and the reaction mixture was stirred for 2 hours at 0–5° C. The reaction was diluted with water (500 ml) and stirred for one hour. The crude product was isolated by extracting into dichloromethane and purified by column chromatography on silica gel (2% methanol in dichloromethane was used as the eluent) to give the title dye (3.5 g) as an oil having a λmax at 528 nm.

EXAMPLE 2

Preparation of a Dye of the Following Formula
Dye 2

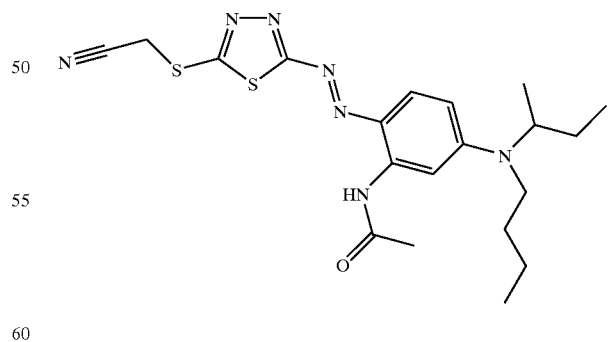

(a) Preparation of 2-Amino-5-cyanomethylthio-1,3,4-thiadiazole

Chloroacetonitrile (45.8 g) was added dropwise to a solution of 5-amino-1,3,4-thiadiazole-2hiol (67.9 g) in ethanol (500 ml) at reflux temperature. The reaction mixture was heated under reflux for 6 hours and then approximately 400 ml of distillate was removed using a Dean-Stark trap. The reaction mixture was allowed to cool, water (150 ml) was added and the pH was adjusted to 7.0 with sodium carbonate. The resultant precipitate was collected by filtration, washed with water and dried to give 45.7 g of product which was used directly in the next step.

(b) Preparation of Title Dye

The title dye was prepared analogously to the method described in Example 1, stage (b) above, using 12.9 g of 2-amino-5-cyanomethylthio-1,3,4-thiadiazole (from Example 2, stage (a) above) and 16.4 g of 3-(N-n-butyl-N-sec-butylamino)acetanilide [from Example 1, stage 1 (a) above] to give, as a green solid, 6.1 g of the title dye having a λmax at 532 nm.

EXAMPLE 3 Dye 3

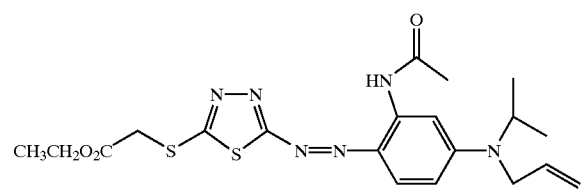

Dye 3 was prepared using the method described in Example 1 except that in stage a there was used isopropylbromide and allyl bromide in the place of 2-bromobutane and 1-bromobutane respectively. The title dye had a λmax at 524 nm.

EXAMPLE 4 Dye 4

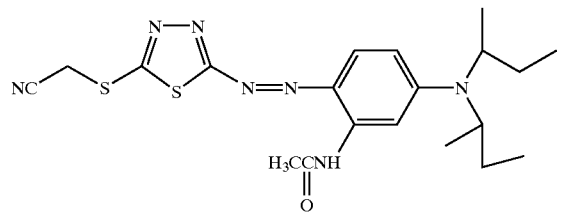

Dye 4 was prepared using the method described in Example 2 except that in the place of 1-bromobutane there was used 2-bromobutane. The resultant dye had a λmax at 532 nm.

EXAMPLE 5 Dye 5

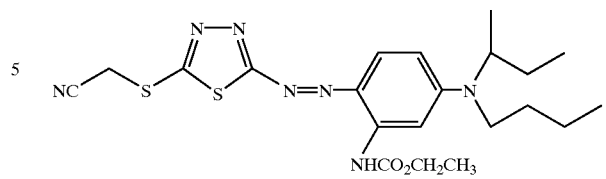

Dye 5 was prepared using the method described in Example 2 except that 3-(N-n-butyl-N-sec-butylamino) acetanilide was hydrolysed in the presence of base and then reacted with ethyl chloroformate. The resultant dye had a λ at 531 nm.

EXAMPLE Dye 6

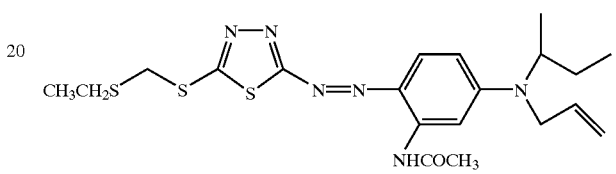

Dye 6 was prepared using the method described in Example 1 except that in stage a there was used isopropylbromide and alkyl bromide in the place of 2-bromobutane and 1-bromobutane respectively, and that 2-amino-5-ethylthio-1,3,4-thiadiazole was used in place of the amine used in stage (b). The resultant dye had a λmax at 522 nm.

EXAMPLE 7 Dye 7

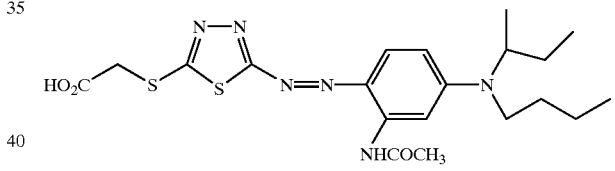

Dye 7 was prepared using the method described in Example 2 except that in stage (a) sodium chloroacetate was used in place of chloroacetonitrile. The resultant dye had a λmax at 501 nm.

EXAMPLE 8 Dye 8

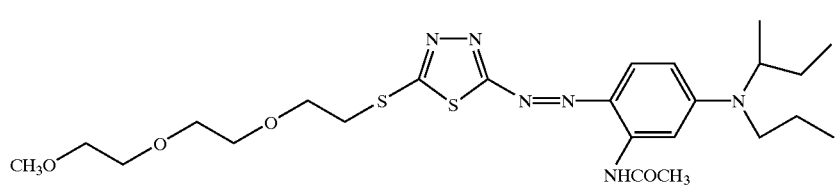

Dye 8 was prepared using the method described in Example 2 except that in stage (a) methoxyethoxyethoxyl ethyl chloride was used in place of chloroacetonitrile. The resultant dye had a λmax at 527 nm.

EXAMPLE 9

Preparation of Inks

The following abbreviations are used:

XA is Xerox 4024 paper from Rank Xerox;
GB is Gilbert Bond paper from the Mead Corporation;
WC is Wiggins Conqueror High White Wove 100 gm$^{-2}$ paper from Arjo Wiggins Ltd; and
"-" means not measured;
OD means optical density;
LF means light fastness;
ΔE is the time in hours over which the LF is measured; and WF: Wet fastness.

Each dye or dye mixture was dissolved in benzyl alcohol and 2-pyrrolidone. The water-dissipatable polyester was dissipated in water and then mixed with the dye solution and shaken to give the homogeneous ink.

Table 1 below shows the final formulation of an ink (ink 1) prepared as above. The first column identifies the component and the subsequent columns show the amount in parts by weight of each component in the resultant ink.

TABLE 1

| Component | Ink 1 | Ink 2 | Ink 3 | Ink 4 | Ink 5 | Ink 6 | Ink 7 | Ink 8 |
|---|---|---|---|---|---|---|---|---|
| Dye 1 | 1 | | | | | | | |
| Dye 2 | | 1 | | | | | | |
| Dye 3 | | | 1 | | | | | |
| Dye 4 | | | | 1.5 | | | | |
| Dye 5 | | | | | 1.5 | | | |
| Dye 6 | | | | | | 1 | | |
| Dye 7 | | | | | | | 1.5 | |
| Dye 8 | | | | | | | | 1.5 |
| Benzyl Alcohol | 10 | 10 | 10 | 10 | 10 | 10 | 12 | 10 |
| 2-Pyrollidone | 20 | 20 | 20 | 20 | 20 | 20 | 20 | 20 |
| Resin 1 | | | | | | | | |
| Resin 2 | | | 50 | | | | | |
| Resin 3 | 45 | 45 | | 45 | 45 | 45 | 20 | 45 |
| Water | 24 | 24 | 19 | 23.5 | 23.5 | 24 | 43.5 | 23.5 |
| Surfactant | | | | | | | 3.0 | |

Footnote: The resins were used as a 20% w/v solution in water at pH 7.1.

The inks described above were printed onto different paper using a Olivetti JP 450 ink jet printer and tested as follows (the results are given in Table 2):

The Chroma and the OD of a print was measured using an X-Rite 938 Spectrodensitometer;

the Lf (ΔE) was determined by the change in I.a.b coordinates as measured by an X-Rite 938 Spectrodensitometer after the print has been irradiated for 100 hrs (ΔE) in a Atlas Ci35A Weatherometer, where a low figure indicates high light-fastness;

the WF was determined by running water (2 ml) down lines of print at an angle of approximately 45° immediately after the lines had been printed and the prints were given a score of 1–10 where 1 indicates poor wet fastness and 10 indicates no detected ink run down.

TABLE 2

| Ink | Paper | Chroma | OD | LF | WF |
|---|---|---|---|---|---|
| 1 | WC | 58.17 | 0.86 | 30.3 | 10 |
| 1 | XA | 57.13 | 0.83 | 27.5 | 10 |
| 2 | XA | 62.35 | 1.117 | 22.43 | 10 |
| 2 | WC | 61.93 | 0.915 | 22.75 | 10 |
| 3 | WC | 59.63 | 0.98 | 25.15 | 10 |
| 3 | XA | 58.29 | 0.952 | 24.21 | 10 |
| 4 | XA | 56.97 | 1.014 | 11.43 | 9.5 |
| 4 | WC | 61.21 | 1.101 | 11.71 | 9.5 |

TABLE 2-continued

| Ink | Paper | Chroma | OD | LF | WF |
|---|---|---|---|---|---|
| 5 | XA | 56.07 | 0.995 | 27.31 | 10 |
| 5 | WC | 58.71 | 1.026 | 25.93 | 10 |
| 6 | WC | 64.31 | 1.14 | 26.29 | 10 |
| 6 | XA | 59.77 | 1.044 | 26.69 | 10 |
| 7 | XA | 54.01 | 1.013 | 29.97 | 8 |
| 7 | HG201 | 63.31 | 1.224 | 18.93 | 9 |
| 8 | WC | 60.35 | 0.986 | 36.97 | 9.5 |
| 8 | XA | 60.33 | 1.066 | 24.55 | 9.5 |

Further inks comprising the exemplified dyes and resins may be may be prepared having the formulations described in the following tables. In the tables the number in the first column (headed Ex. no.) denotes the example number(s) of dye(s) to be used in the ink and the number in the second column indicates the parts per weight of the total dye added. In the third column "Resin#" identifies which of Resins 1, 2 and 3 was used (each resin comprising 20% solids and 80% water) with the number of parts by weight of the resin being shown in brackets. Numbers quoted in the third column onwards refer to the number of parts of the relevant ingredient and all parts are by weight.

The following other abbreviations are used in the tables:

BZ=benzyl alcohol; DEG=diethylene glycol; NMP=N-methyl pyrollidone; TEN=triethanolamine; CAP=caprolactam; BUT=butylcellosolve; ACE=acetone; IPA=isopropanol; MEOH=methanol; 2P=pyrolidinone; MIBK=methylisobutyl ketone; TDG=thiodiglycol; PHO=$K_2PO_4$; FRU: fructose; SUR=Surfynol 465 (a surfactant); and DMB=diethylene glycol monobutyl ether.

TABLE 3

| Ex. No. | Dye | Resin (parts) | Water | BZ | DEG | ACE | 2P | MIBK | BUT |
|---|---|---|---|---|---|---|---|---|---|
| 1 | 2.0 | 1(10) | 58 | | 6 | 4 | 10 | 10 | |
| 1 | 2.1 | 2(6) | 60.9 | 8 | | | 20 | 1 | 2 |
| 2 | 1.8 | 2(10) | 63.2 | 5 | | | 15 | | 5 |
| 2 | 5.0 | 3(4) | 50.0 | 20 | 2 | 1 | 15 | 3 | |
| 1 | 1.0 | 3(7) | 63 | 5 | 4 | | 15 | 5 | |

TABLE 4

| Ex. no. | Dye | Resin (parts) | Water | BZ | DEG | ACE | NaOH | IPA | 2P |
|---|---|---|---|---|---|---|---|---|---|
| 2 | 3.0 | 1(10) | 62.8 | 5 | 4 | | 0.2 | | 25 |
| 1 | 5.0 | 2(15) | 50 | 20 | | | | 10 | |
| 2 | 2.0 | 3(5) | 60.7 | 10 | | 10 | 0.3 | 3 | 10 |

TABLE 5

| Ex. No. | Dye | Resin (parts) | Water | BZ | DEG | ACE | NaOH | $(NH_4)_2SO_4$ | 2P | MIBK | BUT |
|---|---|---|---|---|---|---|---|---|---|---|---|
| 1 | 1.1 | 2(12) | 61.9 | 9 | | | 0.5 | 0.5 | 9 | 5 | 1 |
| 2 | 4.1 | 3(10) | 48.6 | 11 | 2 | 4 | | 0.3 | 20 | | |

TABLE 6

| Ex. No. | Dye | Resin (parts) | Water | BZ | DEG | ACE | IPA | MeOH | 2P | MIBK | BUT |
|---|---|---|---|---|---|---|---|---|---|---|---|
| 1 + 2 | 5.0 | 3(5) | 54 | 15 | 3 | 3 | 6 | | 5 | 4 | |
| 2 | 2.4 | 1(5) | 51.6 | 5 | | 4 | | 6 | 20 | 5 | 1 |
| 1 | 3.2 | 2(4) | 57.8 | 8 | 4 | 3 | 5 | 4 | 6 | 5 | |
| 1 | 2.0 | 3(10) | 73 | 6 | 2 | 2 | 1 | | 4 | | |
| 2 | 3.3 | 2(12) | 63.7 | | | 10 | | 2 | | 6 | 3 |

TABLE 7

| Ex. No. | Dye | Resin (parts) | Water | BZ | NMP | FRU | DMB | CH$_3$NH$_2$ | CAP |
|---|---|---|---|---|---|---|---|---|---|
| 2 | 4.0 | 2(10) | 67 | 10 | 14 | 1 | 4 | 0.2 | |
| 1 | 2.2 | 2(10) | 67 | 10 | 3 | 2 | 6 | | |
| 1 | 5.0 | 3(12) | 54.4 | 5 | 17 | | 7 | | |
| 2 | 4.0 | 3(20) | 56 | 5 | 8 | | 5 | | 2 |
| 1 | 1.5 | 2(13) | 71.5 | | 2 | | 12 | | |

TABLE 8

| Ex. No. | Dye | Resin (parts) | Water | BZ | NMP | TDG | FRU | PHO | DMB | CAP |
|---|---|---|---|---|---|---|---|---|---|---|
| 1 | 2.5 | 2(15) | 60 | 6 | 15 | | | 0.12 | | 4 |
| 2 | 0.9 | 1(5) | 63 | 10 | 20 | | 0.5 | 0.2 | | |
| 1 | 2 | 2(10) | 60 | 11 | | 10 | | | 6 | 1 |
| 2 | 2.0 | 2(10) | 56 | 10 | 5 | 12 | | | 5 | |

TABLE 9

| Ex. No. | Dye | Resin (parts) | Water | BZ | NMP | SUR | TEN | TDG | FRU | PHO | DMB |
|---|---|---|---|---|---|---|---|---|---|---|---|
| 1 | 1.5 | 1(10) | 63 | 5 | | 0.15 | 0.5 | 20 | | | |
| 2 | 2.1 | 1(15) | 65 | 5 | 5 | 0.1 | 0.2 | 2 | 0.5 | 0.1 | 5 |

TABLE 10

| Ex. No. | Dye | Resin (parts) | Water | BZ | NMP | SUR | TDG | CH$_3$NH$_2$ | CAP |
|---|---|---|---|---|---|---|---|---|---|
| 1 | 3.1 | 3(10) | 60 | 12 | | 0.3 | 15 | 0.2 | |
| 2 | 5.0 | 1(15) | 43 | 15 | 15 | | 5 | | 2 |

TABLE 11

| Ex. No. | Dye | Resin (parts) | Water | BZ | NMP | TEN | TDG | PHO | DMB | CH$_3$NH$_2$ | CAP |
|---|---|---|---|---|---|---|---|---|---|---|---|
| 2 | 4.0 | 3(15) | 59 | 9 | 7 | 0.5 | | 0.95 | 5 | | |
| 1 | 5.0 | 1(5) | 51 | 15 | 20 | 1 | 1 | | | 1 | 1 |

EXAMPLE 10 Dye 10

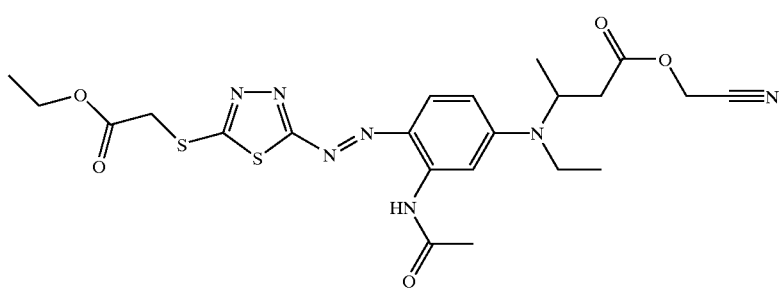

17

(a) Preparation of Coupling Component:

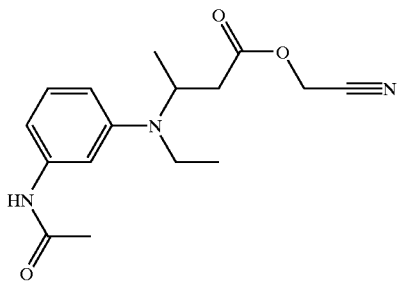

(i) 3-Aminoacetanilide (75.0 g) and crotonic acid (60.0 g) were mixed together and stirred for 16 hours at 80° C. The reaction mixture was cooled to 40° C. and ethyl acetate (400 ml) was added. The product was extracted into 2 M sodium carbonate(1 liter) which was then adjusted to pH 5 with conc. hydrochloric acid. The product was extracted into ethyl acetate, dried ($MgSO_4$), filtered and evaporated to dryness to give a brown oil which was used directly in the next step.

(ii) The product from step (a)(i) above (35.4 g), iodoethane (26.5 g), calcium carbonate (1 7.0 g) and water were placed in a flask and heated with stirring at 70–80° C. for 22 hours. The hot reaction was filtered through kieselguhr and the cooled solution extracted with dichloromethane and evaporated to dryness to give a brown oil which was used directly in the next step.

(iii) The product from step (a)(ii) above(10.0 g), chloroacetonitrile (5.68 g), potassium carbonate (5.24 g) and dimethyl formamide (100 ml) were mixed and heated at 80° C. for 45 hours. The reaction mixture was poured onto water and extracted with ether to give the title coupling component (13.84 g).

(b) Preparation of Dye 10

The method of Example 1, stage (b), was repeated except that in place of 3-(N-n-butyl-N-sec-butylamino)acetanilide there was used the product from Example 10, Stage (a).

The crude product was isolated by extracting into dichloromethane and purified by column chromatography on silica gel (a mixture of 15:85 volume ratio methanol to dichloromethane, respectively, was used as the eluent) to give the title dye (6.09 g) as an oil having a $\lambda$max at 524 nm.

EXAMPLE 11 Dye 11

Example 10 may be repeated except that in place of 3-aminoacetanilide there is used 3-propionamido aniline.

EXAMPLE 12 Dye 12

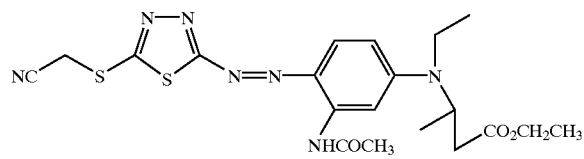

18

(a) Preparation of Coupling Component.

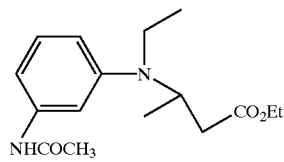

(i) Zinc dust (30 g) was activated by stirring in 5% hydrochloric acid. The acid was removed and the zinc then washed with water, methanol and then ether. The zinc dust was then slowly added to the flask containing acetic acid (85 ml), m-aminoacetamide (15 g) and ethyl acetoacetate (13 ml). The reaction was stirred at 65° C. for 2 hours and then allowed to cool to room temperature. Methanol (50 ml) was added and the reaction mixture was filtered. The residue was washed with methanol and the combined filtrates were evaporated to dryness. Ice/water (100 ml) and dichloromethane (100 ml) were added to the residue, the pH of the mixture was adjusted to 10 with ammonia solution, and then the product was isolated from the dichloromethane layer to give an oil (21.1 g).

(ii) The product from stage (i) above (9.39 g), iodoethane (5.2 ml), calcium carbonate (3.6 g) and water (100 ml) were placed in a flask and heated at 70° C. for 16 hours. The cooled reaction mixture was extracted with dichloromethane to give the coupling component as a brown oil (10.3 g)

(b) Preparation of Dye 12

The method of Example 1, stage (b), was repeated except that in place of the amine from Maybridge Chemical Company there was used from Example 12, stage (a), and in place of 3-(N-n-butyl-N-sec-butylamino) acetanilide there was used the product of Example 2, stage (a).

EXAMPLE 13 Dye 13

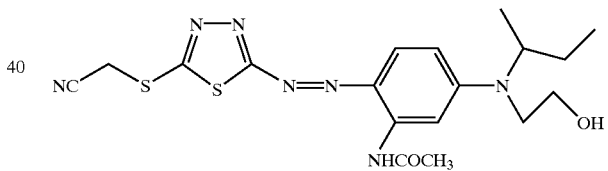

(a) Preparation of 3-[N-(2-hydroxyethyl)-N-sec-butylamino]acetanilide.

(i) 3-(N-sec-Butylamino)acetanilide 3-aminoacetanilide (186.2 g), 2-bromobutane (198 g), triethylamine (150 g) and ethanol (1 liter) were heated under reflux for 64 hours. After cooling to room temperature triethylamine hydrochloride was removed by filtration and the solvent was evaporated under reduced pressure to leave a dark oil which was purified by chromatography on silica gel. The product was crystallised by trituration under hexane to give 152 g of product.

(ii) 3-[N-(2-hydroxyethyl)-N-sec-butylamino]acetanilide.

The product from stage (i) above (30 g), calcium carbonate (43.7 g), potassium iodide (7.3 g) and 2-chloroethanol (29.3 ml) in water (75 ml) were heated under reflux for 80 hours. The reaction mixture was allowed to cool, filtered and the residue washed with dichloromethane (2×100 ml). The filtrates were extracted with dichloromethane and evaporated to dryness to give a brown oil (29.0 g).

(b) Preparation of Dye 13

The method of Example 1, stage (b) was repeated except that in place of the amine from Maybridge Chemical Company there was used 2-amino-5-cyanomethylthio-1,3,4-thiodiazole and in place of 3-(N-n-butyl-N-sec-butylamino) acetanilide there was used the product of Example 13, stage (a). Dye 13 was obtained as a dark green solid having a λmax at 524 nm.

EXAMPLE 14 Dye 14

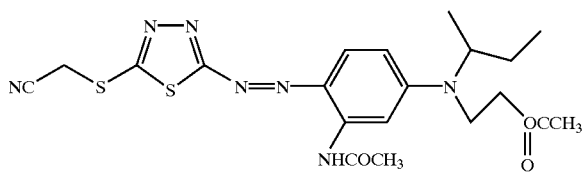

Dye 14 was prepared by the reaction of Dye 13 (1.09 g) with acetyl chloride (0.54 ml) and piperidine (1 drop) in anhydrous dichloromethane (50 ml) for 4 hours at room temperature. The reaction mixture was washed with water, 2 M sodium bicarbonate (300 ml) and water (300 ml) and evaporated to dryness to give the title dye (0.55 g) as a green solid having a λmax at 524 nm.

EXAMPLE 15

Preparation of Inks

The inks described in Table 12 were prepared by the general method described above in Example 9. All abbreviations used have the same meanings as those in Example 9.

TABLE 12

| Component | Ink 3 | Ink 4 | Ink 5 | Ink 6 | Ink 7 | Ink 8 |
|---|---|---|---|---|---|---|
| Dye 10 | 1.5 | | 1.5 | 1.5 | 1.5 | |
| Dye 12 | | 0.3 | 1.5 | | | |
| Dye 13 | | 1.2 | | | 1.5 | |
| Dye 14 | | | | | 1.5 | 1.5 |
| Benzyl Alcohol | 10 | 14 | 12 | 10 | 10 | 11 |
| 2-Pyrollidone | 20 | 18 | 20 | 20 | 20 | 19 |
| Resin 1 | | 45 | | | | |
| Resin 2 | | | | | | 45 |
| Resin 3 | 45 | | 20 | 45 | 45 | |
| Water | 23.5 | 21.5 | 43.5 | 23.5 | 23.5 | 23.5 |
| Surfactant | | | 3 | | | |

Footnote: The Resins were used as a 20% w/v solution in water at pH 7.1.

Certain of the inks described in Table 12 were printed onto paper and the OD, LF and WF measured using the method described in Example 9. The results are shown in Table 13 below.

TABLE 13

| Ink | Paper | Chroma | OD | LF | WF |
|---|---|---|---|---|---|
| 3 | WC | 57.0 | 0.88 | 22.2 | 9 |
| 3 | XA | 54.7 | 0.86 | 19.6 | 9.5 |
| 5 | XA | 53.17 | 0.84 | 29.21 | 10 |
| 5 | HG 201 | 67.81 | 1.19 | 38.55 | 10 |
| 6 | WC | 57.05 | 0.99 | 32.57 | 9 |
| 6 | XA | 55.51 | 1.00 | 31.87 | 9 |
| 7 | XA | 57.25 | 0.98 | 14.19 | 9.5 |
| 7 | WC | 60.53 | 1.03 | 15.75 | 9.5 |

Further inks comprising the exemplified dyes and resins may be may be prepared having the formulations described in the following tables. In the tables the number in the first column (headed Ex. no.) denotes the example number(s) of dye(s) to be used in the ink and the number in the second column indicates the parts per weight of the total dye added. In the third column "Resin#" identifies which of Resins 1, 2 and 3 was used (each resin comprising 20% solids and 80% water) with the number of parts by weight of the resin being shown in brackets. Numbers quoted in the third column onwards refer to the number of parts of the relevant ingredient and all parts are by weight.

The abbreviations used in the tables are as defined in Example 9 above:

TABLE 14

| Ex. No. | Dye | Resin (parts) | Water | BZ | DEG | ACE | 2P | MIBK | BUT |
|---|---|---|---|---|---|---|---|---|---|
| 10 | 2.0 | 1(10) | 58 | | 6 | 4 | 10 | 10 | |
| 10 | 2.1 | 2(6) | 60.9 | 8 | | | 20 | 1 | 2 |
| 11 | 1.8 | 2(10) | 63.2 | 5 | | | 15 | | 5 |
| 11 | 5.0 | 3(4) | 50.0 | 20 | 2 | 1 | 15 | 3 | |
| 10 | 1.0 | 3(7) | 63 | 5 | 4 | | 15 | 5 | |

TABLE 15

| Ex. no. | Dye | Resin (parts) | Water | BZ | DEG | ACE | NaOH | IPA | 2P |
|---|---|---|---|---|---|---|---|---|---|
| 11 | 3.0 | 1(10) | 52.8 | 15 | 4 | | 0.2 | | 15 |
| 10 | 5.0 | 2(15) | 50 | 20 | | | | 10 | |
| 11 | 2.0 | 3(5) | 65.7 | 10 | | 5 | 0.3 | 3 | 10 |

TABLE 16

| Ex. No. | Dye | Resin (parts) | Water | BZ | DEG | ACE | NaOH | (NH4)2 SO4 | 2P | MIBK | BUT |
|---|---|---|---|---|---|---|---|---|---|---|---|
| 10 | 1.1 | 2(12) | 61.9 | | 9 | | 0.5 | 0.5 | 9 | 5 | 1 |
| 11 | 4.1 | 3(10) | 48.6 | 11 | 2 | 4 | | 0.3 | 20 | | |

TABLE 17

| Ex. No. | Dye | Resin (parts) | Water | BZ | DEG | ACE | IPA | MeOH | 2P | MIBK | BUT |
|---|---|---|---|---|---|---|---|---|---|---|---|
| 10 + 11 | 5.0 | 3(5) | 54 | 15 | 3 | 3 | 6 | | 5 | 4 | |
| 12 | 2.4 | 1(5) | 51.6 | 5 | | 4 | | 6 | 20 | 5 | 1 |
| 13 | 3.2 | 2(4) | 57.8 | 8 | 4 | 3 | 5 | 4 | 6 | 5 | |

TABLE 17-continued

| Ex. No. | Dye | Resin (parts) | Water | BZ | DEG | ACE | IPA | MeOH | 2P | MIBK | BUT |
|---|---|---|---|---|---|---|---|---|---|---|---|
| 14 | 5.0 | 3(10) | 60 | 6 | 2 | 2 | 1 |  | 4 | 10 |  |
| 12 | 1.3 | 2(12) | 65.7 |  |  | 10 |  | 2 |  | 6 | 3 |

TABLE 18

| Ex. No | Dye | Resin (parts) | Water | BZ | NMP | FRU | DMB | CH₃NH₂ | CAP |
|---|---|---|---|---|---|---|---|---|---|
| 12 | 4.0 | 2(10) | 57 | 10 | 14 | 1 | 4 | 0.2 |  |
| 10 | 2.2 | 2(10) | 67 | 10 | 3 | 2 | 6 |  |  |
| 10 | 5.0 | 3(12) | 44.4 | 15 | 17 |  | 7 |  |  |
| 11 | 4.0 | 3(20) | 56 | 5 | 8 |  | 5 |  | 2 |
| 14 | 3.0 | 2(13) | 65 | 5 | 2 |  | 12 |  |  |

TABLE 19

| Ex. No. | Dye | Resin (parts) | Water | BZ | NMP | TDG | FRU | PHO | DMB | CAP |
|---|---|---|---|---|---|---|---|---|---|---|
| 10 | 2.5 | 2(15) | 60 | 6 | 15 |  |  | 0.12 |  | 4 |
| 11 | 0.9 | 1(5) | 63 | 10 | 20 |  | 0.5 | 0.2 |  |  |
| 13 | 5.0 | 2(10) | 57 | 11 |  | 10 |  |  | 6 | 1 |
| 13 | 2.0 | 2(10) | 56 | 10 | 5 | 12 |  |  | 5 |  |

TABLE 20

| Ex. No. | Dye | Resin (parts) | Water | BZ | NMP | SUR | TEN | TDG | FRU | PHO | DMB |
|---|---|---|---|---|---|---|---|---|---|---|---|
| 10 | 1.5 | 1(10) | 63 | 5 |  | 0.15 | 0.5 | 20 |  |  |  |
| 12 | 2.1 | 1(15) | 55 | 15 | 5 | 0.1 | 0.2 | 2 | 0.5 | 0.1 | 5 |

TABLE 21

| Ex. No. | Dye | Resin (parts) | Water | BZ | NMP | SUR | TDG | CH₃NH₂ | CAP |
|---|---|---|---|---|---|---|---|---|---|
| 10 | 3.1 | 3(10) | 64 | 8 |  | 0.3 | 15 | 0.2 |  |
| 11 | 5.0 | 1(15) | 43 | 15 | 15 |  | 5 |  | 2 |

TABLE 22

| Ex. No. | Dye | Resin (parts) | Water | BZ | NMP | TEN | TDG | PHO | DMB | CH₃NH₂ | CAP |
|---|---|---|---|---|---|---|---|---|---|---|---|
| 13 | 4.0 | 3(15) | 59 | 9 | 7 | 0.5 |  | 0.95 | 5 |  |  |
| 13 | 5.0 | 1(5) | 51 | 15 | 20 | 1 | 1 |  |  | 1 | 1 |

What is claimed is:

1. A composition which comprises:
(a) from 0.5 to 15 parts in total of a dye of Formula (1):

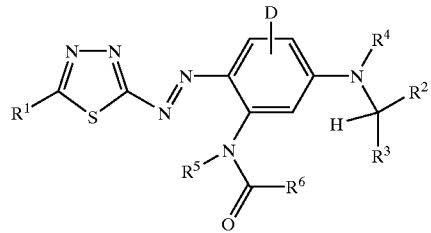

Formula (1)

$R^1$ and D are each independently H or a substituent;
$R^2$ and $R^3$ are each independently optionally substituted alky, aryl or aralkyl, or $R^2$ and $R^3$ together with the carbon atom to which they are attached form an optionally substituted ring;
$R^4$ and $R^5$ are each independently H or optionally substituted alkyl, aryl or aralkyl; and
$R^6$ is optionally substituted alkyl, aryl or aralkyl:
(b) from 0.2 to 25 parts of a water-dissipatable polymer;
(c) from 40 to 90 parts of water, and
(d) from 0 to 60 parts of organic solvent;
wherein all parts are by weight and the total number of parts (a)+(b)+(c)+(d) add up to 100.

2. A composition according to claim 1 wherein $R^2$ and $R^3$ are free from the following substituents: —NO₂, —CN, —Cl, —Br, —F, —OH, —OC₁₋₄-alkyl, —COOC₁₋₄—(CH₂)₁₋₄—CN, —CONH₂, —CONH(C₁₋₄-alkyl), —OCO(C₁₋₄-alkyl) and —COO(C₁₋₄-alkyl).

3. A composition according to claim 1 wherein at least one of $R^2$ and $R^3$ carries a substituent and at least one of said substituents is selected from the group consisting of: —$NO_2$, —CN, —Cl, —Br, —F, —OH, —$OC_{1-4}$-alkyl, —$COOC_{1-4}$—$(CH_2)_{1-4}$—CN, —$CONH_2$, —$CONH(C_{1-4}$-alkyl), —$OCO(C_{1-4}$-alkyl) and —$COO(C_{1-4}$-alkyl).

4. A composition according to claim 1 wherein $R^1$ and D are each independently halo; optionally substituted alkyl, aryl, aralkyl; or a group of formula —X—$R^7$ wherein X is O, S, SO, $SO_2$, or $NR^8$ wherein $R^7$ and $R^8$ are each independently H or optionally substituted alkyl, aryl or aralkyl.

5. A composition according to claim 1 wherein $R^1$ and D are each independently halo; optionally substituted $C_{1-6}$-alkyl; or a group of formula —X—$R^7$ wherein X is O, S, SO, $SO_2$, or $NR^8$ wherein $R^8$ is H or $C_{1-6}$-alkyl and $R^7$ is optionally substituted $C_{1-6}$-alkyl.

6. A composition according to claim 1 wherein $R^2$ and $R^3$ are each independently optionally substituted $C_2$-alkyl, or $R^2$ and $R^3$ together with the carbon atom to which they are attached form an optionally substituted 5- or 6-membered ring.

7. A composition according to claim 1 wherein $R^4$ and $R^5$ are each independently H or optionally substituted $C_{1-6}$-alkyl.

8. A composition according to claim 1 wherein said optional substituents are each independently selected from carboxy, sulpho, nitro, halo, alkyl, alkoxy, hydroxy, amine, mercapto, thioalkyl, cyano, ester and amide, with the proviso that $R^2$ and $R^3$ are free from the following substituents: —$NO_2$, —CN, —Cl, —Br, —F, —OH, —$OC_{1-4}$-alkyl, —$OC_{1-4}$-alkylene—CN, —$CONH_2$, —$CONH(C_{1-4}$-alkyl), —$COOC_{1-4}$—$(CH_2)_{1-4}$—CN, —$OCO(C_{1-4}$-alkyl) and —$COO(C_{1-4}$-alkyl).

9. A composition according to claim 1 wherein the organic solvent comprises a mixture of a water-miscible organic solvent and a water-immiscible organic solvent.

10. A composition according to claim 1 wherein the polymer is a water-dissipatable polyester.

11. A composition according to claim 1 comprising two or more dyes at least one of which is a dye of Formula (1).

12. An ink jet printing ink according to any one of the preceding claims.

13. A process for printing an image on a substrate comprising applying thereto, by means of an ink jet printer, a composition according to claim 1.

14. A paper, an overhead projector slide or a textile material printed with a composition according to claim 1.

15. A cartridge suitable for use in an ink jet printer containing a composition according to claim 1.

16. An ink jet printer containing a composition according to claim 1.

* * * * *